United States Patent [19]

Gaffney

[11] 3,924,802

[45] Dec. 9, 1975

[54] PLASTIC BAG WITH HANDLES

[75] Inventor: William Gaffney, Bronx, N.Y.

[73] Assignee: Charlotte Mintz, New York, N.Y.

[22] Filed: Aug. 2, 1974

[21] Appl. No.: 494,203

Related U.S. Application Data

[62] Division of Ser. No. 308,293, Nov. 20, 1972, Pat. No. 3,865,018.

[52] U.S. Cl. .............................. 229/54 R; 229/54 R
[51] Int. Cl.² .......................................... B65D 33/10
[58] Field of Search ..................... 229/54 R; 150/12

[56] References Cited
UNITED STATES PATENTS

| | | |
|---|---|---|
| 3,227,358 | 1/1966 | Laquerre ........................ 229/54 R |
| 3,490,682 | 1/1970 | Schwarzkopf ..................... 229/54 R |
| D188,524 | 8/1960 | Finkelstein ........................ 150/12 X |

*Primary Examiner*—Donald F. Norton

[57] ABSTRACT

A bag of thermoplastic sheet material with a closed bottom, an open top and closed sides has a pair of bag handles of thermoplastic sheet material welded to the bag adjacent the top. Each handle has the same width throughout when measured in a direction from the bottom to the top of the bag, so that the handles can be cut from a web with no loss or waste. The handles are so configured as to prevent distortion of the bag mouth when a load is placed in the bag.

3 Claims, 3 Drawing Figures

PLASTIC BAG WITH HANDLES

CROSS REFERENCE TO RELATED APPLICATION

This application is a division of my copending application Ser. No. 308,293, filed on Nov. 20, 1972 for Plastic Bags with Handles and Method and Apparatus for Making the Same, now U.S. Pat. No. 3,865,018.

BACKGROUND OF THE INVENTION

1. Field of the Invention

The present invention relates to a plastic bag with handles.

2. Description of the Prior Art

It is well known in the prior art to provide plastic bags having handles which are welded or fused to the bag body. In the prior art, however, the handles are cut from a web of preformed handles or from a handle material sheet in such a manner that a large part of the handle material is wasted. It is toward elimination of this problem that the present invention is directed.

SUMMARY OF THE INVENTION

It is an object of the present invention to provide a plastic bag having handles welded thereto, the handles being economically produced.

Another object of the present invention is to provide handles for a plastic bag which will prevent distortion of the bag mouth when material or substantial weight is put in the bag.

Still another object of the present invention is to provide an improved bag with flat handles fused to a bag body and providing hand holes, the handles being cut from handle sheets without waste or loss of handle sheet material.

Yet another object of the present invention is to provide a plastic bag which is inexpensive to manufacture.

Generally the foregoing and other objects are achieved by a plastic bag having plastic handles welded to the bag. The handles are of equal width throughout when measured in a direction from the bottom to the top of the bag.

Still further objects and advantages of the invention, in part, will be obvious and, in part, will be apparent from the specifications.

The invention accordingly consists in the features of construction, combinations of elements and arrangement of parts which will be exemplified in the plastic bag hereinafter described in the appended claims.

BRIEF DESCRIPTION OF THE DRAWINGS

For a better understanding of the present invention, reference should be had to the accompanying drawings, wherein like numerals of reference indicate similar parts throughout the several views and wherein.

DESCRIPTION OF THE PREFERRED EMBODIMENT

Figure 1:
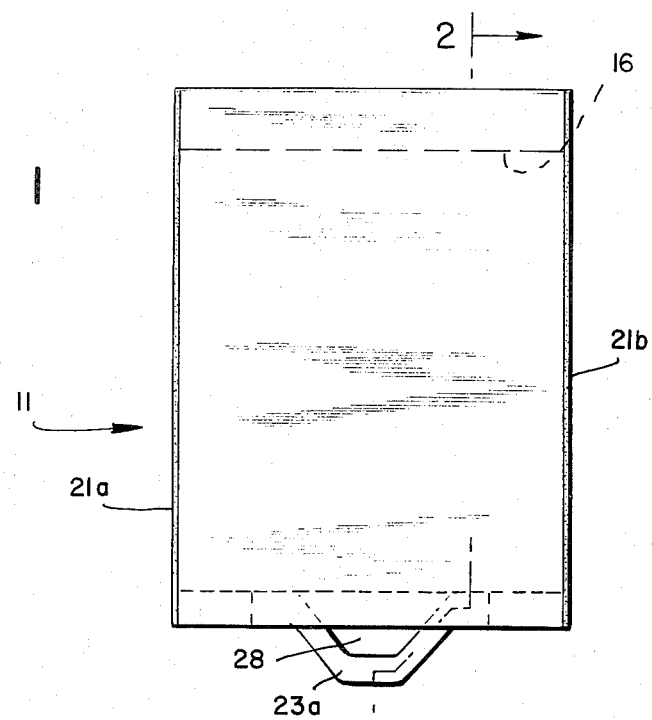
FIG. 1 is a top view of a plastic bag.
Figure 2:
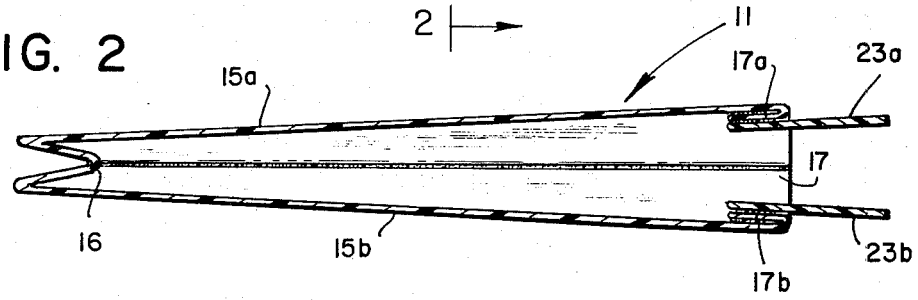
FIG. 2 is a full sectional view along line 2—2 in FIG. 1.

Referring in detail to FIGS. 1 and 2, a bag constructed in accordance with the present invention is designated with the reference numeral 11.

Figure 3:
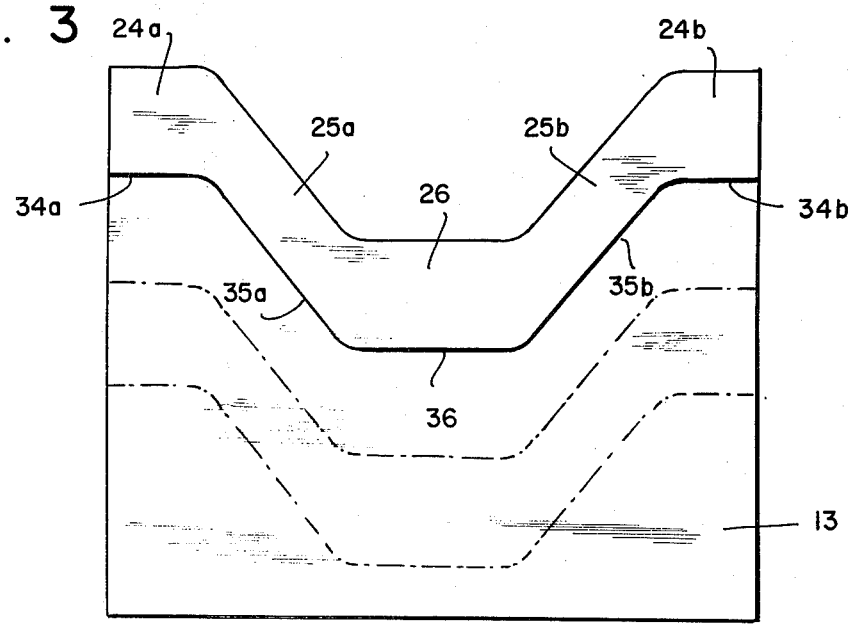
FIG. 3 is a top view of the handle sheet material illustrating the cut lines forming the periphery of the handle.

As can be seen in FIG. 2 the bag body consists of a continuous piece of thermoplastic sheet material having symmetrical coextensive first and second wall portions 15a and 15b with an inwardly pleated gusset 16 therebetween to form the bottom of the bag 11. The bag 11 has sealed parallel side edges 21a and 21b and is open at its top end, to form a mouth 17. At the mouth 17 the first wall 15a and the second wall 15b are infolded to form interior flaps 17a and 17b respectively to which the handles 23a and 23b, which will be described hereinafter in detail, are secured. The handles 23a and 23b are secured to the internal surfaces of the flaps 17a and 17b which are the same width as the end portions of the handles 23a and 23b in a manner as to provide a hand hole 28. The handles 23a and 23b are formed, as can be seen in FIG. 3 from a strip of handle material 13. The handle material 13 may be of any suitable thermoplastic sheet material.

Since the bag walls 15a and 15b are comprised of a thermoplastic material, and the bag handles 23a and 23b are comprised of a thermoplastic material, the handles may be welded to the bag walls by any conventional heated welding means. The flaps 17a and 17b are also heat welded to the wall 15a and 15b respectively. A bag in accordance with this embodiment possesses substantially increased strength and durability.

While the following discussion will concern itself with handle 23a it is to be understood that handle 23b is identical to handle 23a and thus the discussion will apply with equal effect to the handle 23b.

Handle 23a has aligned end portions 24a and 24b projecting in opposite directions. Extending from the end portions 24a and 24b are upwardly converging inclined handle portions 25a and 25b. A transverse straight central portion 26 which is parallel to end portions 24a and 24b joins the converging inclined handle portions 25a and 25b. The handle 23a is of a similar width throughout when measuring in a direction from the top to the bottom of the bag.

As can be seen in FIG. 3 the edges 34a, 34b, 35a, 35b and 36 which form the outer edge of handle 23a, form the inner edge of the next succeeding handle 33 which will be formed from the sheet 13. The inner and outer edges of each handle are parallel to each other. Since the handles are nested in the sheet 13 there is no waste of the handle material when the handles are cut. The inclined portions 25a and 25b displace the central portion 26 from the end portions 24a and 24b and the mouth of the bag to define the hand hole 28 of sufficient size to enable a hand to enter the same.

The handle 23a hereinabove described, in addition to eliminating waste from the handle sheet material during its formation, also contributes to a bag which will not substantially deform at its mouth when a load is placed in the bag. Upwardly converging portions 25a and 25b the attached portions of which are widely spaced serve to tension the edges of the bag mouth between them when a load is placed in the bag.

It will be recognized by those skilled in the art that the objects of the present invention have been achieved by a bag having handles that are of the same width, when measured in a direction from the top to the bottom of the bag.

While in accordance with the patent statues a preferred embodiment has been described in detail, it should be understood that the invention is not limited thereby.

What is claimed is:

1. A bag comprising a bag body of thermoplastic sheet material, having first and second superimposed walls, said walls being connected at their lower edges to form a closed bottom and at their sides, said bag body being open at its other end to form a mouth, and a pair of handles of thermoplastic sheet material each consisting of aligned outwardly projecting end portions, portions extending from the inner ends of said end portions converging beyond said bag body and a central portion parallel to said end portions interconnecting the outer ends of said converging portions, said portions of each handle lying in a common plane, said end portions of said handles being fused to said walls, respectively, and located between said walls, said central portions of said handles being spaced from said mouth to provide hand holes for said handles, said handles having parallel inner and outer edges across the full length of said handles and having the same widths throughout when measured in a direction from the bottom to the mouth of the bag body so that said handles can be cut from a web without waste.

2. A bag in accordance with claim 1, wherein said walls have inturned flaps at their upper ends, and said outer end portions of said handles being fused to said flaps, respectively, and said flaps being fused to said walls, respectively.

3. A bag in accordance with claim 2 wherein said inturned flaps are of an identical width to the width of said outwardly extending end portions of said handles.

* * * * *